(12) United States Patent
Kull

(10) Patent No.: US 6,217,126 B1
(45) Date of Patent: Apr. 17, 2001

(54) RAILWAY EMULATION BRAKE

(75) Inventor: Robert C. Kull, Olney, MD (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/224,540

(22) Filed: Dec. 31, 1998

(51) Int. Cl.[7] .................................................. B60T 15/14
(52) U.S. Cl. ................................ 303/3; 303/15; 303/20
(58) Field of Search .............................. 303/3, 15, 20, 303/28, 128, 81

(56) References Cited

U.S. PATENT DOCUMENTS

| | | | |
|---|---|---|---|
| 4,344,138 | 8/1982 | Frasier | 364/426 |
| 4,687,258 | * 8/1987 | Astley | 303/3 |
| 5,064,251 | 11/1991 | Romansky | 303/3 |
| 5,172,316 | * 12/1992 | Root et al. | 303/3 |
| 5,503,469 | * 4/1996 | Cunkelman | 303/15 |
| 5,630,565 | * 5/1997 | Lumbis | 303/3 |
| 5,681,015 | 10/1997 | Kull | 246/187 |

* cited by examiner

*Primary Examiner*—Matthew C. Graham
(74) *Attorney, Agent, or Firm*—Buchanan Ingersoll, P.C.

(57) ABSTRACT

An apparatus and method for low power ECP brake emulation in a freight train having ECP equipped cars and one or more non-ECP equipped locomotives wherein power for the ECP equipment is provided by the 74 VDC locomotive battery. The apparatus includes an adapter for interfacing the locomotive MU cable and the ECP wire to supply sufficient power to operate the ECP equipment on each car indefinitely in a low power emulation mode. The method includes interfacing the locomotive MU cable to the ECP wire, implementing a low power emulation mode wherein pneumatic signals sent via the brake pipe are detected by pressure sensors and communicated to ECP control valves for changing the brake cylinder pressure accordingly. The method further includes minimizing power consumption by providing power only to the brake pipe sensors and minimal electronics to monitor pressure changes and thereafter activating other sensors and controls only as needed.

42 Claims, 3 Drawing Sheets

RAILWAY EMULATION BRAKE

BACKGROUND

The invention relates generally to freight train brake control systems and more particularly to a system for operably interfacing ECP equipped freight cars with non-ECP equipped locomotives.

The North American Railroad industry, lead by the Association of American Railroads (AAR) has developed standards for Electrically Controlled Pneumatic (ECP) brakes. These standards include an electric trainline, 2 wire, 8 gauge, which operates at 230 VDC, for providing power and communications to and from the ECP units on each car. Communications must following Echelon LonWorks standards, using a PLT-10A transceiver. Each car is budgeted at up to 10 watts power consumption, in a train of 160 cars, up to 12,000 ft. length. A separate 230 VDC cable must be provided through each locomotive and a 230 VDC locomotive power supply rated at 2,500 watts is required on at least one of the locomotives to power the ECP system on each car. Additionally, a locomotive ECP "head end unit" (HEU) is required to provide communications, locomotive interfaces, and operator interface with the ECP cars.

The ECP system may be provided as overlay to conventional pneumatic brake valves, or as "all electric," replacing the pneumatics service portion function. The "all electric" ECP system provides the most economical solution, but requires locomotives to be equipped to support ECP operation. There are usually multiple locomotives for a train, and all are required to be equipped with the 230 VDC ECP trainline cable. The lead locomotive must have the ECP HEU and at least one locomotive has to be equipped with the 230 VDC ECP power supply.

Prior art ECP systems which are of the "overlay" type permit the cars to be operated in normal pneumatics mode braking ECP when ECP equipped locomotives were not available. Additionally, even with "all electric" ECP cars, a "pneumatic emulation" mode can be provided using the ECP system battery or an on-board power source. Pneumatic emulation describes the operation of the ECP system when braking commands are communicated to the ECP equipment pneumatically via the brake pipe in the same manner as conventional pneumatic operation, rather than by an electric command signal. Thus, a non-ECP locomotive can still operate the brakes on ECP cars. The downside of the emulation mode described is that the power source for the ECP system is problematic. If an ECP battery is used there will necessarily be a limited operating life. The alternative, adding on-board power generation, greatly adds to the cost of the system.

In any event, future ECP trains designed to AAR guidelines, with the separate 230 VDC trainline, require each car and all locomotives in the train to be modified. With the exception of small "captive" railroads which do not need to interchange cars and locomotives with others, it is very difficult to manage the transition to full ECP operation. Therefore, each car would have to be equipped to operate with both ECP and conventional pneumatic brake systems. However, for many companies it is not economically viable to equip each car with both ECP equipment and pneumatic control valves. Likewise, it is an economic penalty to require on-board power generation to support electric emulation for conventional pneumatics operation.

Therefore, there is a need for a way to employ ECP cars with non-ECP locomotives without having to rely on the ECP battery or requiring on-board power generation. Accordingly, an apparatus and method is provided for operating the ECP equipment on-board each car in a low power emulation mode which can be powered indefinitely by the standard 74 VDC locomotive battery. Consequently, "all electric" ECP cars can be powered and controlled by standard, unmodified locomotives thereby supporting a gradual transition to "all electric" ECP cars without the need to retrofit every locomotive within a short time period. Additionally, co-pending U.S. patent applications Ser. No. 09/224,543, titled "ECP TRAIN LINE COMMUNICATIONS FOR RAILWAY FREIGHT CAR BRAKES," filed Dec. 31, 1998, and Ser. No. 09/224,541, titled "RAILWAY LOCOMOTIVE ECP TRAIN LINE CONTROL," filed on Dec. 31, 1998, which similarly disclose subject matter related to the transition from pneumatic to ECP brake systems, are hereby incorporated herein by reference.

SUMMARY

An apparatus and method for low power ECP brake emulation in a freight train having ECP equipped cars and one or more non-ECP equipped locomotives is provided wherein the ECP equipment on each car is powered by a power source on the locomotive, typically the 74 VDC locomotive battery. To supply power from the locomotive battery to each ECP car, an adapter is employed to connect the locomotive Multiple Unit ("MU") cable to the ECP trainline wire on each car. In a low power ECP emulation method, sufficient power is provided by the locomotive MU power source to operate the ECP equipment on each car indefinitely. In some embodiments, the ECP battery on each car can even be charged from the locomotive battery. The low power ECP emulation mode utilizes brake pipe sensors communicating with the ECP equipment for receiving pneumatic brake commands via the brake pipe. Power is conserved because the brake pipe sensors can use less power than would be required to power the ECP transceivers on each car to receive the brake signals electrically. The basic method includes interfacing the locomotive MU cable to the ECP wire, implementing a low power ECP emulation mode wherein pneumatic signals sent via the brake pipe are detected by pressure sensors and communicated to the ECP control valves for regulating brake cylinder pressure accordingly. According to the method power consumption is further minimized by providing power to only the brake pipe sensors and minimal ECP electronics to monitor pressure changes, and thereafter activating other sensors and controls only as needed.

Other details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION OF CERTAIN EMBODIMENTS

Figure 1:
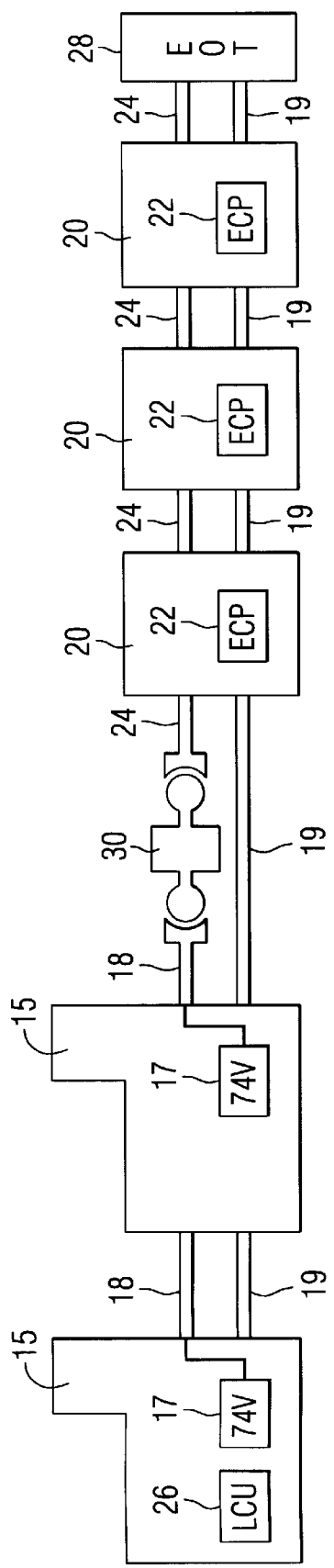
FIG. 1 is a schematic diagram of a train of non-ECP equipped locomotives operably interfaced with ECP equipped freight cars.

Referring now to the drawing figures wherein like reference numbers refer to similar parts throughout the several views, a presently preferred low power ECP emulation braking system is shown in FIG. 1 wherein a consist of standard, non-ECP equipped locomotives 15 is operably interfaced with a train of ECP equipped cars 20.

The locomotives 15 each include a standard 74 VDC nominal power source or battery 17 and are interconnected by a standard locomotive Multiple Unit (MU) cable 18. As with all conventional freight trains, a brake pipe (BP) 19 is provided the length of the train including each locomotive 15 and all of the freight cars 20 to the end-of-train (EOT) unit 28. Each of the cars 20 is equipped with ECP equipment 22 and is interconnected by trainline ECP wire 24. The ECP wire 24 is also connected to the EOT 28. In order to communicate with the EOT unit 28, at least the lead locomotive 15 is provided with a standard EOT locomotive control unit (LCU) system 26. An adapter 30 is provided between the locomotive MU cable 18 and the ECP wire 24 so that the ECP systems 22 on board each car 20 may be powered from an existing power source, such as locomotive 74 VDC nominal battery 17. The MU cable 18 includes, inter alia, a power line from the 74 VDC nominal locomotive battery 17, and interconnects this voltage source to each locomotive 15.

The adapter 30 can have the basic circuitry shown in FIG. 2 for operatively connecting the MU cable 18 to the ECP trainline 24. The adapter 30 can include a DC—DC converter 32 for providing the ECP trainline voltage either as the AAR standard 230 VDC nominal, or as 74 VDC. Additionally, while we refer to "74 VDC" or "230 VDC," these are nominal voltages, and it is to be understood that the voltage can vary depending upon apparatus and operating conditions, including the distance of transmission in trains of varying lengths. It will also be apparent that other voltages could be satisfactorily employed.

Figure 2A:
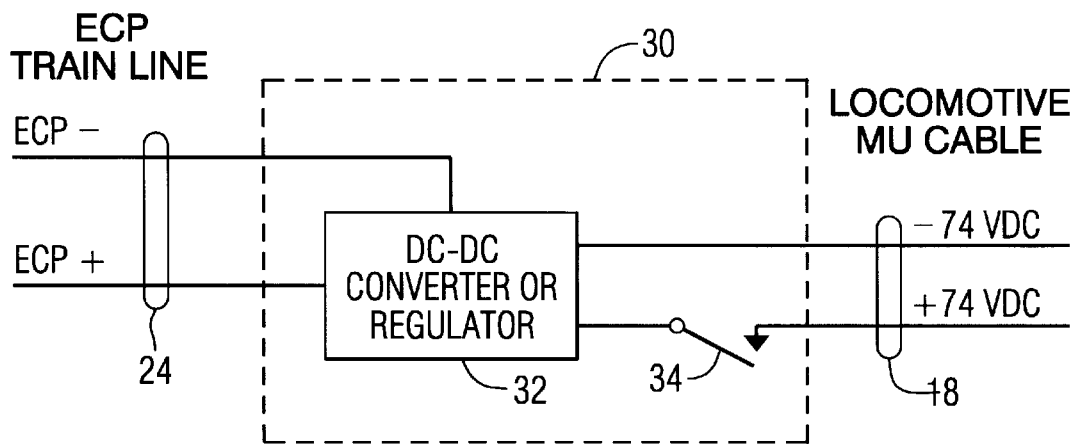
FIG. 2a is a simplified circuit diagram of an MU cable-to-ECP wire adapter.

The adapter 30 can also include on/off power control to the ECP trainline 24 via a switch 34. In some applications the locomotive source can be used directly by the ECP equipped cars. The DC to DC converter 32, as shown in FIG. 2a, may be any type of voltage increasing or decreasing device. This would include a device in which the DC from the locomotive is first converted to an AC or pulsating DC voltage and transformed to a higher or lower voltage. A transformer can be used in the alternating current situation. After the voltage has been changed to an appropriate higher or lower level alternating current, it can then be rectified back to supply the desired ECP DC voltage level. Where necessary appropriate smoothing through the use of capacitors or inductors may be appropriate.

Figure 2B:
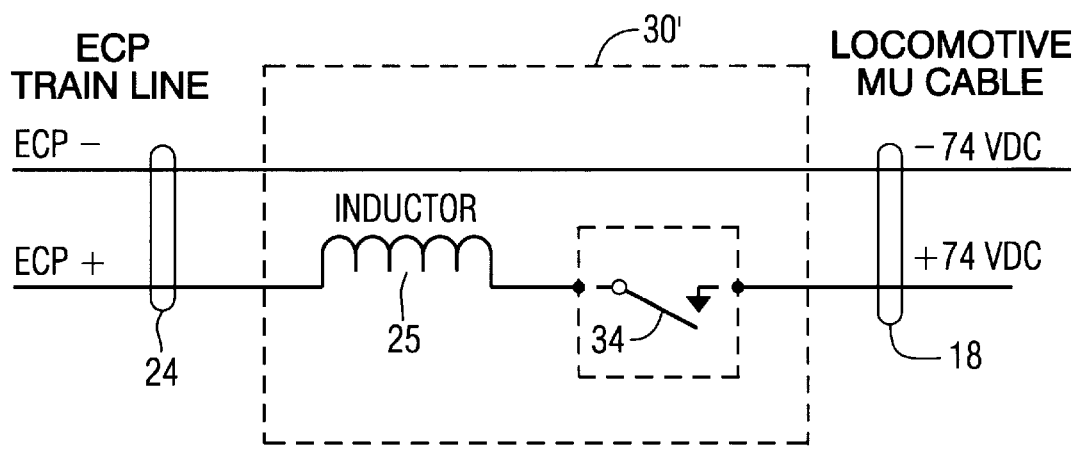
FIG. 2b is a circuit diagram of an alternative embodiment having existing voltage levels.

In FIG. 2b where 74 VDC is utilized, the DC—DC converter 32 may be replaced by a voltage regulator, or may even be eliminated and an inductor 25 can be utilized instead.

Figure 3:
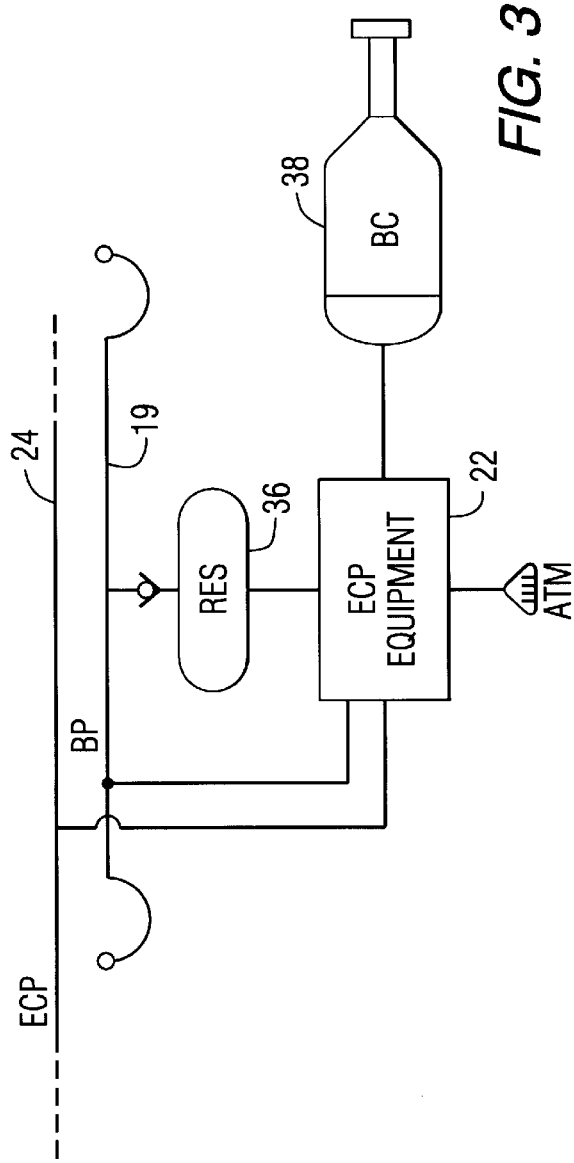
FIG. 3 is a schematic diagram of the freight brake equipment on-board each car.

FIG. 3 illustrates the basic brake system components on board each ECP car 20. These components typically include a reservoir (RES) 33 which is charged with pressurized fluid from the BP 19, a fluid pressure operated brake cylinder device (BC) 36 and the ECP equipment 22 necessary for implementing the braking functions on each car. In a fully electric ECP train, including an ECP equipped locomotive, brake commands wo be transmitted electrically to the ECP equipment 22 via the ECP wire 24. The ECP equipment 22 would then control the BC 36 pressure by either admitting pressure into the BC 36 from the RES 33 to apply the brakes or exhausting pressure from the BC 36 to the atmosphere (ATM) to release the brakes. The ECP equipment 22 also normally monitors pressure in the BP 19 and the BC 36 during normal operations. In an emulation mode however, braking commands are pneumatically transmitted via the brake pipe in a more conventional manner. These BP 19 signals are detected by the ECP equipment 22 as described below.

Figure 4:
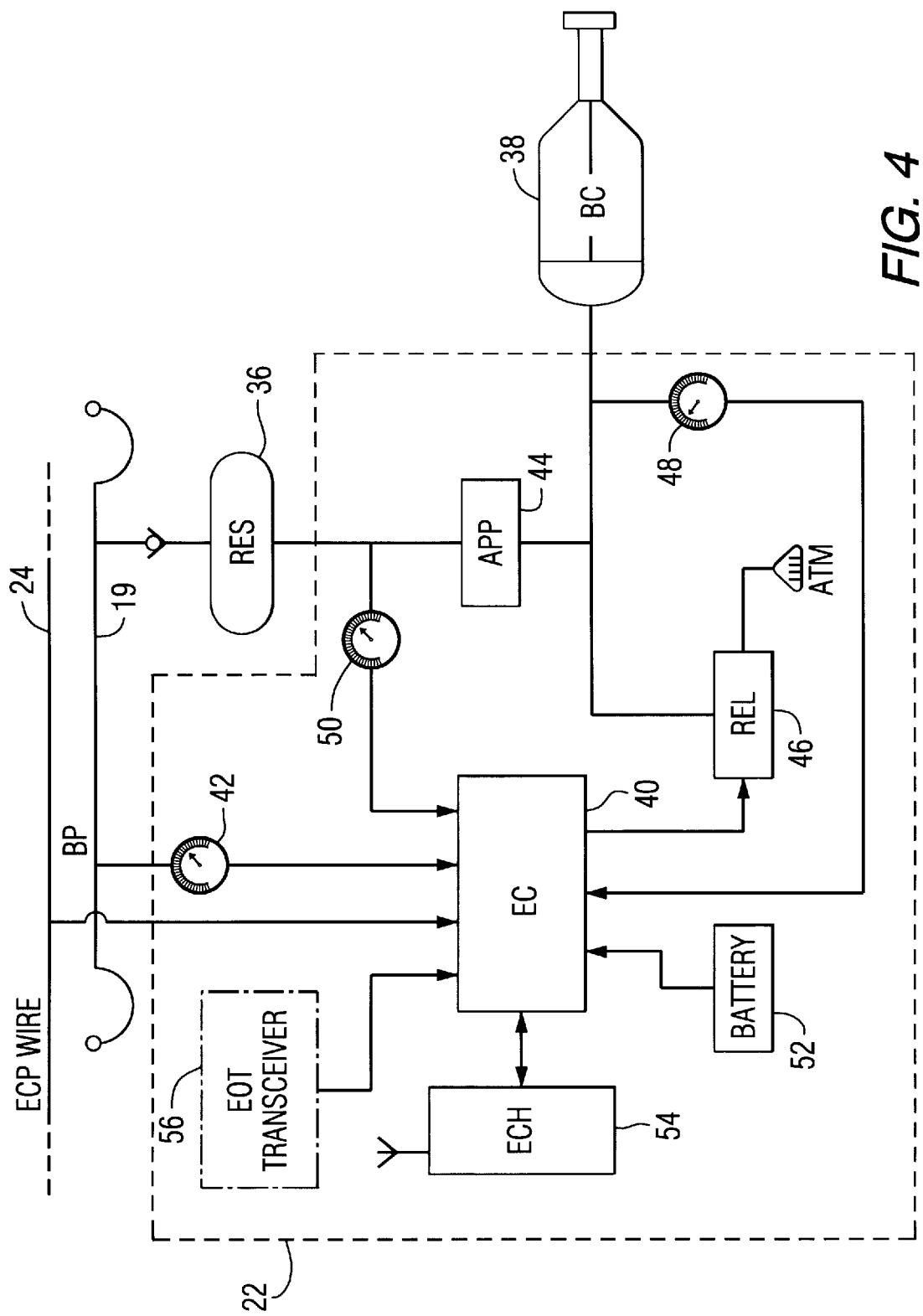
FIG. 4 is a schematic diagram similar to FIG. 3 except showing more details of the ECP equipment.

Referring now to FIG. 4, a more detailed schematic illustrates the various typical components for the ECP equipment 22. These components include an electronic controller (EC), which controls a solenoid application valve (APP) 44 and a solenoid release valve (REL) 46 to regulate the pressure in the BC 36. The APP valve 44 is connected between the RES 33 and the brake cylinder 36. To apply the brakes, the EC 40 can actuate the APP valve 44 to admit pressure from the RES 33 into the BC 36. Conversely, to release the brakes, the EC 40 can operate the REL valve 46 to exhaust pressure from the BC 36 to the ATM. The ECP equipment 22 also normally includes a brake pipe pressure sensor 42, a brake cylinder pressure sensor 48 and a reservoir pressure sensor 50.

SYSTEM OPERATION

In the low power emulation mode, power consumption is minimized by providing power only to the brake pipe pressure sensor 42 and to minimal electronics in the EC 40 to monitor brake pipe pressure. Power is applied to other sensors and controls only as needed to perform braking functions. In this manner, a very low power mode of operation is provided for which can be maintained continuously from the standard 74 VDC locomotive battery 17.

An "all electric" ECP system can be provided to AAR specifications, which provides a low power "emulation mode" to support operation at least equivalent to the conventional pneumatics service portion brake valve with non-ECP equipped locomotives 15. The ECP system, when in an emulation mode, can be designed to consume less than 1 watt of total power. This allows the ECP wire 24 to be powered directly from the standard locomotive MU cable 18, with associated access to the locomotive MU power source such as the nominal 74 VDC locomotive battery 17. With each car 20 consuming a maximum of 1 watt in the emulation mode, the car ECP batteries 52 can be maintained at full charge while connected to the 74 VDC power line in the MU cable 18, based upon the standard ECP wire 24, and a maximum of 150 cars 20 over 12,000 feet in train length.

Emulation mode is defined generally as responding to changes in brake pipe pressures as with conventional pneumatic brake control valves. There are many ways to achieve power savings in the ECP car system. A number of such ways are listed below, by way of example only and not as a limitation to the invention, including:

(1) activating only the brake pipe pressure transducer and minimal electronics to monitor pressure changes when in normal operation, wherein the BP 19 is charged and there are no braking actions;

(2) the APP 44 and REL 46 solenoid valves need to be powered only when air is to be added or removed from the BC 36 such that no power is required for steady state conditions (either as no braking or no changes in brake cylinder pressure);

(3) activating additional sensors and controls only as needed when a BP 19 pressure reduction is sensed, normally involving a brake cylinder pressure transducer while air is added to the brake cylinder and a sensor for periodically checking the pressure in the RES 33;

(4) keeping the Echelon transceiver normally turned off with the ability to selectively turn it on for short periods of time to suit specific conditions;

(5) using the ECP battery 52 to allow short term power demands over the 1 watt limit, based upon maintaining the average demand under the one watt limit;

(6) providing for close to zero power consumption in shut-down mode, when the car is stored without brake pipe pressure, brake cylinder pressure, or trainline power. Return of brake pipe pressure re-activates the system;

(7) continuing the emulation mode with loss of trainline power, based upon battery operation, with options for supplemental on-board power generation; and (8) providing for switching to normal ECP mode, to AAR standard operation and associated higher power limits, upon detection of 230 VDC power.

An adapter can be provided to interface between the connector for the standard locomotive MU cable 18 and the connector for the standard ECP wire. This allows "all electric" ECP "unit trains" (identical car designs) to be operated from standard locomotives 15 in an identical manner as conventional pneumatic brake systems, without power limits with respect to car battery 52 capacity.

The EOT 28 device can also have additional functions, as with "AAR standard" EOT units (as the Pulse TrainLinkTm system), such as charging of the battery from either the 74 VDC or 230 VDC sources, with minimum voltages half of the nominal voltages and inclusion of the Echelon power line communications capability in addition to standard RF EOT communications. This provides for EOT 28 operation with battery charging by the ECP wire 24, operating in either normal (230 VDC) or emulation (74 VDC) modes. In emulation mode, it also provides for communication with individual cars 20. The trainline power budget allows the EOT 28 Echelon transmission to be on continuously, while individual cars 20 can only be used on an intermittent basis if desired.

The full system configuration is generally based upon using standard locomotives 15, with standard EOT LCU 26 systems, the trainline based ECP cars 20, and the ECP communications equipped EOT system 28 such as, for example, TrainLink™. This provides for each ECP car 20 to periodically communicate via the Echelon transceiver 54 to the EOT unit 28. The EOT unit 28, in turn, can communicate summary health or fault messages to the lead locomotive EOT LCU 26, using the message display capability. This provides for advising car 20 status to the locomotive 15, using hardware which is commonly equipped on North American locomotives.

There are a variety of ways to conduct an initial check of ECP operation on each car 20 at the time of train departure testing. For example, a BP 19 pressure reduction can be used to turn on the ECP Echelon transceiver 54 for a short period of time, with transmission of a health status message to the EOT 28. The EOT 28 can then report the total number of cars 20 which had reported as passing internal tests. Likewise, each Echelon transceiver 54 can initiate a message to the EOT 28 to report known problems, such as an ECP battery 52 low charge state.

In addition to an EOT unit 28 at the normal end-of-train location, an optional system would be to have EOT 28 compatible radio frequency transmission (RF) capability added to one or more car ECP systems 22. The car ECP system 22 already has a spare data port to allow addition of an EOT transceiver 56 (450 MHz band in North America) which would allow RF communications to and from the locomotive 15 to additional locations within the train. However, approximately double the power would be required for "EOT RF" equipped ECP cars 20. This increase power consumption could be acceptably handled by a corresponding reduction of the maximum number of cars in the train. For example, with 5 mid-train EOT RF, the maximum car count would be reduced to 145.

The addition of such mid-train EOT RF cars would provide a couple advantages. One such advantage is that the nearest EOT RF car 20 to the front of the train could be designated as the primary means to communicate all train status data, both ECP equipment 22 and EOT 28, to the locomotive 15. Another advantage is that service braking commands could be made to additional ECP cars 20 within the train to speed BP 19 reductions.

Even in the most basic configuration, using only standard non-ECP locomotives 15, the ECP cars 20 in emulation mode will provide benefits over conventional pneumatic brake systems. Such benefits include more precise brake cylinder pressure, maintenance of desired brake cylinder pressure with leakage conditions, reduced chance for stuck brake conditions, automated health/fault reporting and low reservoir alarm reporting.

The addition of TrainLink EOT-ES to locomotives 15 and selected EOT RF capability to front or mid-train ECP cars 20 would provide additional benefits. For example, faster and more even brake applications as well as quicker service brake releases.

Although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A brake system for a freight train having a locomotive having an MU power source, a plurality of ECP cars each having an ECP cable and on-board equipment including a brake pipe, at least one reservoir charged with pressurized fluid from the brake pipe, a fluid pressure operated brake cylinder device and an electronic controller for controlling the pressure in said brake cylinder device to operate the car brakes, said system comprising:

a. a brake pipe sensor detecting pneumatic brake commands sent via the brake pipe;

b. said electronic controller communicating with said brake pipe sensor and controlling said brake cylinder device responsive to said pneumatic brake commands; and c. said brake pipe sensor and said electronic controller having power supplied from said MU power source on-board said locomotive in said freight train via said ECP cable.

2. The brake system of claim 1 wherein said power source is a 74 VDC nominal locomotive battery.

3. The brake system of claim 1 wherein said power is supplied via a locomotive MU cable operably interfaced with said ECP wire.

4. The brake system of claim 3 further comprising an adapter for connecting said MU cable to said BCP wire such that power from said locomotive power source is supplied to said ECP car.

5. The brake system of claim 1 wherein said electronic controller further comprises solenoid valves for regulating pressure in said brake cylinder device, said solenoid valves receiving power only when pressure in said brake cylinder device is being altered such that no power is consumed by said solenoid valves in steady state conditions.

6. The brake system of claim 5 further comprising a brake cylinder pressure sensor receiving power only when a pneumatic brake command is detected.

7. The brake system of claim 6 wherein said brake cylinder pressure sensor receives power only when a pressure reduction is detected in said brake pipe.

8. The brake system of claim 5 further comprising a reservoir pressure sensor which receives power only when a brake pipe pressure change is detected.

9. The brake system of claim 8 wherein said reservoir pressure sensor further receives power at predetermined intervals.

10. The brake system of claim 1 further comprising an ECP battery on said ECP car for at least supplying short term power demands.

11. The brake system of claim 10 wherein said brake pipe sensor and said electronic controller are powered by said ECP battery responsive to a loss of power from said locomotive battery.

12. The brake system of claim 10 wherein said ECP battery is charged from said locomotive battery.

13. The brake system of claim 1 wherein all electric equipment on each said ECP car is powered "off" responsive to detecting zero brake pipe pressure.

14. The brake system of claim 1 further comprising:
   a) said electronic controller having a sensor for detecting the presence of 230 VDC nominal power on said ECP wire; and
   b) said electronic controller switching to normal ECP operation with associated higher power limits responsive to detecting said 230 VDC nominal power.

15. The brake system of claim 14 wherein said ECP battery is charged from one of said locomotive battery and said 230 VDC nominal power source, when detected.

16. The brake system of claim 1 further comprising:
   a. said freight train further having an EOT unit with standard RF capability and ECP wire communication capability;
   b. a locomotive having a standard EOT LCU for communicating with said EOT unit;
   c. each said ECP car having an ECP transceiver; and
   d. said EOT having an ECP transceiver for communicating with other ECP cars and said EOT via said ECP wire.

17. The brake system of claim 16 wherein each said ECP car initially communicates data to said EOT indicative of on board equipment status, said EOT relaying said data to said locomotive LCU.

18. The brake system of claim 17 wherein said EOT further relays to said locomotive EOT LCU information regarding how many of said ECP cars communicated said data to said EOT.

19. The brake system of claim 17 further comprising each said ECP car having an ECP battery, brake cylinder pressure sensor and reservoir pressure sensor, and wherein said data is indicative of at least one of said brake pipe pressure, said brake cylinder pressure, said reservoir pressure and the status of said ECP battery.

20. The brake system of claim 16 further comprising an EOT transceiver with associated RF capability on at least one of said plurality of ECP cars.

21. The brake system of claim 20 wherein said EOT transceiver equipped ECP car receives at least brake commands via RF transmission from said locomotive EOT LCU.

22. The brake system of claim 20 further comprising said EOT transceiver equipped ECP car communicating RF brake commands received from said locomotive EOT ECU to other of said plurality of ECP cars via said ECP wire to enable faster, more even brake control on each ECP car.

23. The brake system of claim 20 wherein said EOT transceiver equipped ECP car communicates all data from said ECP cars and said EOT unit to said locomotive EOT LCU.

24. The brake system of claim 23 further comprising a plurality of EOT transceiver equipped ECP cars and wherein a closest to said locomotive of said plurality of EOT transceiver equipped ECP cars is designated to communicate all said data to said locomotive EOT LCU.

25. A braking method for a freight train having ECP cars each having an ECP wire and on-board equipment including a brake pipe, at least one reservoir charged with pressurized fluid from the brake pipe, a fluid pressure operated brake cylinder device and an electronic controller for controlling the pressure in said brake cylinder device to operate the car brakes, said system comprising:
   a. pneumatically signaling a brake command via said brake pipe;
   b. detecting said pneumatic brake command via a brake pipe pressure sensor which communicates with said electronic controller;
   c. controlling brake cylinder pressure with said electronic controller responsive to said pneumatic brake command; and
   d. powering said brake pipe sensor and said electronic controller from a battery on-board a locomotive in said freight train.

26. The brake method of claim 25 wherein said powering utilizes a standard 74 VDC nominal locomotive battery.

27. The brake method of claim 25 wherein said powering comprising interfacing a locomotive MU cable with said ECP wire to supply power from said locomotive battery to said ECP car.

28. The brake method of claim 25 further comprising sensing at least one of brake cylinder pressure and reservoir pressure only responsive to detecting said pneumatically signaled brake command.

29. The brake method of claim 28 wherein sensing said brake cylinder pressure occurs only responsive to a reduction in brake pipe pressure.

30. The brake method of claim 28 further comprising sensing said reservoir pressure at predetermined intervals.

31. The brake method of claim 25 further comprising powering high short term power demands on said ECP car using an onboard ECP battery.

32. The brake method of claim 31 further comprising power said brake pipe sensor and said electronic controller using said ECP battery responsive to a loss of sufficient power from said locomotive battery.

33. The brake method of claim 25 further comprising powering off all electrical equipment onboard said ECP car responsive to detecting zero brake pipe pressure.

34. The brake method of claim 25 further comprising:
 a. detecting the presence of 230 VDC nominal power on said ECP wire; and
 b. switching to standard ECP operation with associated higher power limits responsive to detecting said 230 VDC nominal power.

35. The brake method of claim 34 further comprising charging said ECP battery from one of said locomotive battery and said 230 VDC nominal power source.

36. The brake method according to claim 25 wherein said freight train includes an EOT unit having standard RF capability, a locomotive having a standard EOT LCU for RF communications with said BOT unit and each ECP car having an ECP transceiver, said method further comprising:
 a. each said ECP car initially communicating data to said EOT; and
 b. said EOT relaying to said locomotive EOT LCU at least one of said data and information indicative of how many ECP cars communicated said data to said EOT.

37. The brake method of claim 35 further comprising:
 a. sensing brake cylinder pressure;
 b. sensing reservoir pressure;
 c. monitoring ECP battery status; and
 d. wherein said data is indicative of at least one of said brake pipe pressure, said brake cylinder pressure, said reservoir pressure and said ECP battery status.

38. The brake method of claim 37 further comprising:
 a. providing an EOT transceiver with associated RF capability on at least one of said ECP cars; and
 b. communicating between said EOT transceiver equipped ECP car and said locomotive EOT LCU via RF communication.

39. The brake method of claim 38 wherein said conmunicating further comprises communicating at least brake commands from said locomotive EOT LCU.

40. The brake method of claim 38 further comprising said EOT transceiver equipped ECP car relaying said RF brake commands from said locomotive EOT LCU to others of said ECP cars via said ECP wire to enable faster and more even brake control on each ECP car.

41. The brake method of claim 38 further comprising said EOT equipped ECP car communicating all data from said ECP cars and said EOT unit to said locomotive EOT LCU.

42. The method of claim 41 further comprising:
 a. providing a plurality of said ECP cars with said EOT transceivers having RF capability; and
 b. designating a closest to said locomotive of said plurality of EOT equipped ECP cars to communicate all said data from others of said ECP cars and said EOT unit to said locomotive EOT LCU.

* * * * *

UNITED STATES PATENT AND TRADEMARK OFFICE
CERTIFICATE OF CORRECTION

PATENT NO. : 6,217,126 B1
DATED : April 17, 2001
INVENTOR(S) : Robert C. Kull

Page 1 of 1

It is certified that error appears in the above-identified patent and that said Letters Patent is hereby corrected as shown below:

Column 7,
Line 2, change "BCP" to -- ECP --.

Column 9,
Line 13, change "BOT" to -- EOT --.

Column 10,
Line 7, change "conmu-" to -- commu- --.

Signed and Sealed this

Twenty-second Day of January, 2002

Attest:

JAMES E. ROGAN
*Attesting Officer*  *Director of the United States Patent and Trademark Office*